March 20, 1934.  T. S. COOKE  1,951,647
SLUDGE SEPARATOR
Filed June 6, 1931
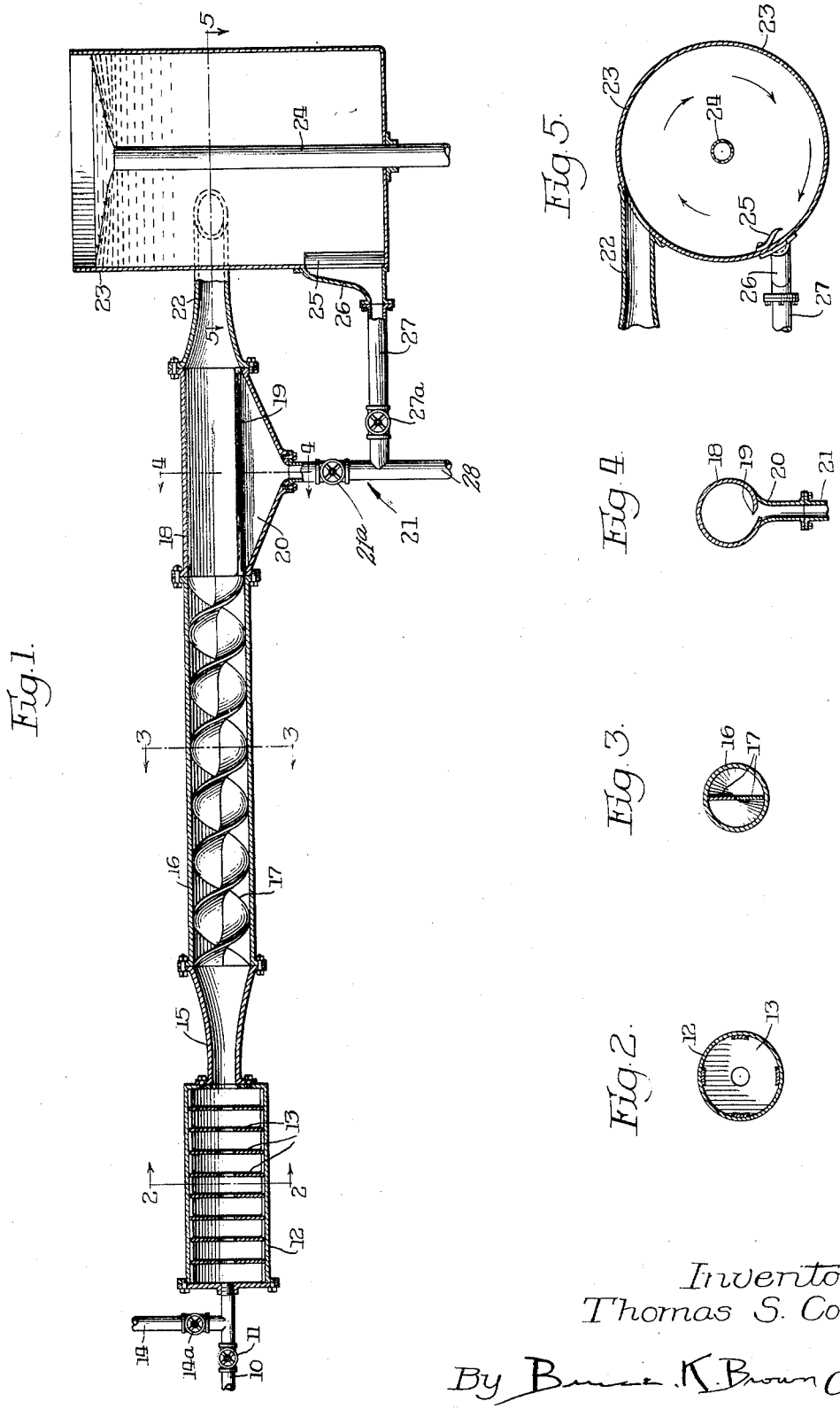
Inventor:
Thomas S. Cooke.
By Bruce K. Brown Atty.

Patented Mar. 20, 1934

1,951,647

UNITED STATES PATENT OFFICE 1,951,647

SLUDGE SEPARATOR

Thomas S. Cooke, New York, N. Y., assignor to Standard Oil Company, Chicago, Ill., a corporation of Indiana Application June 6, 1931, Serial No. 542,567

4 Claims. (Cl. 196—46)

This invention relates to a sludge separator and it pertains more particularly to an apparatus and a method for continuously removing the heavier components from a fluid mixture in an oil refining process.

In refining petroleum hydrocarbons it is necessary to remove certain sulfur compounds, asphaltic materials, etc. and to convert these compounds or materials into unobjectionable forms. The most common treatment is with sulfuric acid, the strength of the acid and the amount of acid used being determined by the nature of the oil undergoing treatment and the desired end product. The reactions of petroleum compounds with sulfuric acid or other treating agents are very complex, and if the products of the first reaction are not immediately separated from the treated oil, secondary reactions may take place which impart undesirable characteristics to the oil and which consume a large portion thereof thereby resulting in a decreased yield and an unsatisfactory oil. The object of this invention is to avoid these undesirable secondary reactions. A further object is to provide a continuous treating system for petroleum oils which will not only separate the treated oil from the other substances in a minimum amount of time, but which will also effect the separation in the minimum space of time. A further object is to provide a simple system than can be installed and operated at a low cost by unskilled workmen. A further object is to provide a method of treating hydrocarbon oils with sulfuric acid in an orifice type mixer without encountering the difficulties inherent in this mixing apparatus, which are the exceedingly fine subdivisions of part of the acid, requiring prolonged settling with consequent harmful reactions between the acid and oil. Other objects will be apparent from the following detailed description.

Briefly, my invention contemplates the centrifugal separation of treated oil from other substances and the skimming of said substances from the oil as it flows through a conduit. To insure complete removal of undesirable substances I supplement this centrifugal skimming by a vertical centrifugal separating chamber, the treated oil being withdrawn from the center of the upper part of the chamber, and the sludge and other undesirable substances being withdrawn from the periphery of the base of said chamber. The centrifugal or rotary motion is imparted to the treated oil as soon as it leaves the mixing chamber so that no time is allowed for secondary reactions to take place. During both stages of the mechanical separation, treated oil is kept away from sludge by centrifugal forces.

In the accompanying drawing wherein similar parts are designated by like reference characters throughout the several views—

Figure 1 is an elevation, partly in section, of my improved sludge separator.

Fig. 2 is a section through the mixer taken along the lines 2—2 of Figure 1.

Figure 3 is a section through the helical baffle conduit taken along the lines 3—3 of Figure 1.

Figure 4 is a section through the skimming device taken along the lines 4—4 of Figure 1, and Figure 5 is a section through the vertical separator taken along the lines 5—5 of Figure 1.

Referring to Figure 1, a petroleum oil is introduced through pipe 10 and valve 11 into mixing chamber 12. This mixing chamber may be a device of the type described in United States patent to Erickson, No. 1,698,432, or it may consist of a conduit provided with a series of spaced baffles 13, said baffles being provided with central apertures. Any type of a mixer may be used, however, without departing from my invention.

The treating fluid, which may be sulfuric acid of 66 Bé. or stronger, is introduced through pipe 14 and valve 14a into pipe 10 or directly into the mixer 12. The liquids are forced through the mixer at a high velocity and are discharged therefrom through a short nipple or adapter 15 into helically baffled chamber 16.

If this chamber is about 8 inches in diameter and 3 feet long the baffle 17 may be made in the form of a double screw or worm with about a 10 inch pitch. The oil and acid passing through this screw are given a rotary motion within chamber 16, which may amount to about 300 R. P. M. The centrifugal forces set up at this rotary velocity cause the acid, sludge and other undesirable substances to be thrown outwardly and the treated oil to occupy the center of the pipe so that the treated oil is out of contact with the acid sludge and reaction products.

Following chamber 16 I provide a skimming section 18 which consists of a pipe provided with an elongated slot cut in the base thereof and with a knife edge 19 extending slightly into the rotating stream of oil and sludge, and directing the outer layer of sludge through the slot to a duct 20, which is secured to the outside of the skimming section. The knife edge is, of course, lengthwise in the skimming section, and so placed that the rotary motion of the oil and sludge tends to skim off the sludge and deflect it into the duct 19. By means of this device, acid sludge is removed from the main body of treated oil within a few seconds (about 3 seconds) from the time at which the acid was added thereto.

Inasmuch as the adjustment of the skimming edge to remove exactly all the sludge is difficult, I prefer to set the knife edge so close to the conduit that practically no oil is removed with the sludge. In order to remove the small amounts of sludge which may remain in the treated oil I introduce the treated oil through nipple or adapter 22 tangentially into an intermediate point of vertical separating chamber 23. This chamber may be about 4 feet in diameter and 12 feet high, and by introducing the oil tangentially at an intermediate point I cause the entire contents of this tank to swirl, thereby throwing the sludge and deleterious substances to the outside of the chamber. The purified oil is withdrawn from a point at the center and near the top of chamber 23 by means of vertical pipe 24. The sludge and undesirable substances are thrown to the outside and settle to the base of the chamber where they are withdrawn by knife edge 25, which directs said substances into a duct 26 which discharges into pipe 27. The sludge from pipe 21 and pipe 27 is discharged into a common pipe 28, through which it is finally removed from the system.

It will be observed that in chamber 23 I make use of the combined action of gravity and centrifugal force, the latter tending to keep the sludge, etc. out of contact with the treated oil whereby deleterious secondary reactions are prevented.

While I have shown a skimming section provided with a fixed slot and knife, it is understood that I may use an adjustable knife edge so that its distance from the pipe may be varied in accordance with the proportion of sludge to oil. I prefer, however, to use valves 21a and 27a in conduits 21 and 27 respectively to regulate the amount of sludge which is withdrawn from skimming section 18 and settling chamber 23 respectively.

My invention is applicable to the treatment of lubricating oils with sulfuric acid for the removal of asphaltic materials, coloring matter, sulfur compounds, etc., it is applicable to the treatment of light oils, such as gasoline and kerosene, with sulfuric acid for the removal of deleterious sulfur compounds, and, in fact, it is applicable to any treatment of one fluid with another when it is desirable to separate the resulting heavy components from light components in a short time interval so that secondary reactions may be prevented.

While I have described preferred embodiments of the invention in detail it is understood that I do not limit myself to the said details except as defined by the following claims, which should be construed as broadly as the prior art will permit.

I claim:

1. In combination, a mixer, means for introducing a hydrocarbon oil and a treating liquid into said mixer, a baffle chamber, an adapter for connecting said mixer with said baffle chamber, a worm in said baffle chamber for imparting a rotary motion to substances passing through said chamber, a skimming section adjacent said baffled chamber, said skimming section being provided with a slot parallel to the axis of said skimming section, a knife edge at one lateral edge of said slot, means for discharging substances directed by said knife edge through said slot, and means for discharging substances from the center of said skimming section.

2. In apparatus of the class described, a mixer, means for introducing a hydrocarbon oil and a treating liquid into said mixer, a baffle chamber connected to said mixer, a screw in said baffle chamber for effecting a rotary motion of fluids passing therethrough, a skimming section connected to said baffle chamber, said skimming section being provided with a slot parallel to the axis of the skimming section, a knife at one side of said slot and extending into said skimming section, means for discharging substances directed by said knife edge through said slot, a centrifugal settling tank, and means for introducing fluids from the center of said skimming section tangentially into said centrifugal settling tank whereby a final separation of lighter and heavier components is effected by the combined action of centrifugal force and force of gravity.

3. In apparatus for separating a treated hydrocarbon oil from a treating liquid, a vertical cylindrical tank, means for introducing a liquid tangentially at an intermediate point of said tank, means for withdrawing liquid from the central point of said tank near the top thereof, and means for skimming heavy material from the periphery of the tank at the bottom thereof.

4. In apparatus for separating hydrocarbon oils from spent liquid reagents, a mixer, means connected to said mixer for effecting a centrifugal motion of liquids discharged therefrom, a horizontal conduit adjacent thereto having a horizontal slot therein, a knife edge adjacent said slot adapted to skim the outside layer from the centrifugally rotating mixture, a vertical separating chamber connected to said horizontal conduit, means for causing centrifugal rotation of liquids in said chamber, means for withdrawing light components from the upper central part thereof, and means for skimming heavy components from the lower periphery thereof.

THOMAS S. COOKE.